United States Patent
Tsirkel et al.

(10) Patent No.: US 6,665,805 B1
(45) Date of Patent: Dec. 16, 2003

(54) METHOD AND APPARATUS FOR REAL TIME MONITORING OF USER PRESENCE TO PROLONG A PORTABLE COMPUTER BATTERY OPERATION TIME

(75) Inventors: Aaron M. Tsirkel, San Jose, CA (US); Mark A. Holler, Palo Alto, CA (US); Paul T. Buchheit, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,592

(22) Filed: Dec. 27, 1999

(51) Int. Cl.[7] ............... G06F 1/26; G06F 13/00
(52) U.S. Cl. ............. 713/323; 713/310; 713/324
(58) Field of Search .................. 713/300, 323, 713/324, 310

(56) References Cited

U.S. PATENT DOCUMENTS

| | | | |
|---|---|---|---|
| 5,396,443 A | * | 3/1995 | Mese et al. .............. 713/321 |
| 5,548,764 A | * | 8/1996 | Duley et al. ............. 713/310 |
| 5,666,541 A | * | 9/1997 | Sellers ................... 713/324 |
| 5,669,004 A | * | 9/1997 | Sellers ................... 713/324 |
| 5,675,810 A | * | 10/1997 | Sellers ................... 713/323 |
| 6,002,427 A | * | 12/1999 | Kipust .................... 348/156 |
| 6,330,676 B1 | * | 12/2001 | Kelsey .................... 713/200 |
| 6,367,020 B1 | * | 4/2002 | Klein ..................... 713/202 |
| 6,374,145 B1 | * | 4/2002 | Lignoul ................... 700/17 |
| 6,418,536 B1 | * | 7/2002 | Park ...................... 713/323 |
| 6,448,978 B1 | * | 9/2002 | Salvador et al. .......... 345/741 |

FOREIGN PATENT DOCUMENTS

JP  11-242733  * 9/1999

* cited by examiner

*Primary Examiner*—Thomas Lee
*Assistant Examiner*—Chun Cao
(74) *Attorney, Agent, or Firm*—Fish & Richardson P.C.

(57) ABSTRACT

A computer is power managed by detecting the presence of a user. A camera is associated with the computer and the output from the camera is analyzed to determine if the user is present. If the user is present, then the computer is maintained in its non-power manage state. When the user leaves, however, the user's presence is no longer detected by the camera, and the power managed state can be quickly entered.

19 Claims, 2 Drawing Sheets

METHOD AND APPARATUS FOR REAL TIME MONITORING OF USER PRESENCE TO PROLONG A PORTABLE COMPUTER BATTERY OPERATION TIME

BACKGROUND

Portable computers often include structure for reducing their power consumption in order to increase the length of time they can run based on battery power, their so-called run time. Power consumption in such a portable computer can be reduced by terminating the supply of power to various devices in the portable computer. This can include turning off the display, stopping the hard drive, and other such features. Current systems of this type have used a time-out period in a register on the computer, e.g. a register in the basic input output system ("BIOS"). Each time the user takes an action on the keyboard or mouse, the BIOS counter is reset. After a user-selectable, predetermined period of inactivity, the power down mode is entered. The time before auto power down usually ranges between 30 seconds and 30 minutes.

Users often find it annoying if the screen blanks while they are taking an action such as reading the contents of the screen. Users hence often choose longer time outs to avoid this situation. However, this increases power consumption, and hence significantly decreases the battery operation time.

The present application teaches a system which recognizes that the user's passive activity, like reading, should be taken into account when determining the time-out for such a system. According to the present invention, user activity is monitored in real time by a detection device, e.g., a camera, which monitors for the presence of a user in real time. The user's presence causes the computer to remain in the "on" or fully powered state. When the user is not present, the computer reverts to its low power state.

SUMMARY

According to an aspect of the invention, a computer monitors the presence of a user, enters a power increase state when the user is present, and a power decrease state when the user is not present.

A power control device for a computer has a power control module which reduces power consumption of the computer in a specified mode; and a user detection system, which detects the presence of a user, and operates the power control module based on the presence of the user.

BRIEF DESCRIPTION OF THE DRAWINGS

These and other aspects will now be described in detail with respect to the accompanying drawings, wherein.

DETAILED DESCRIPTION

Figure 1:
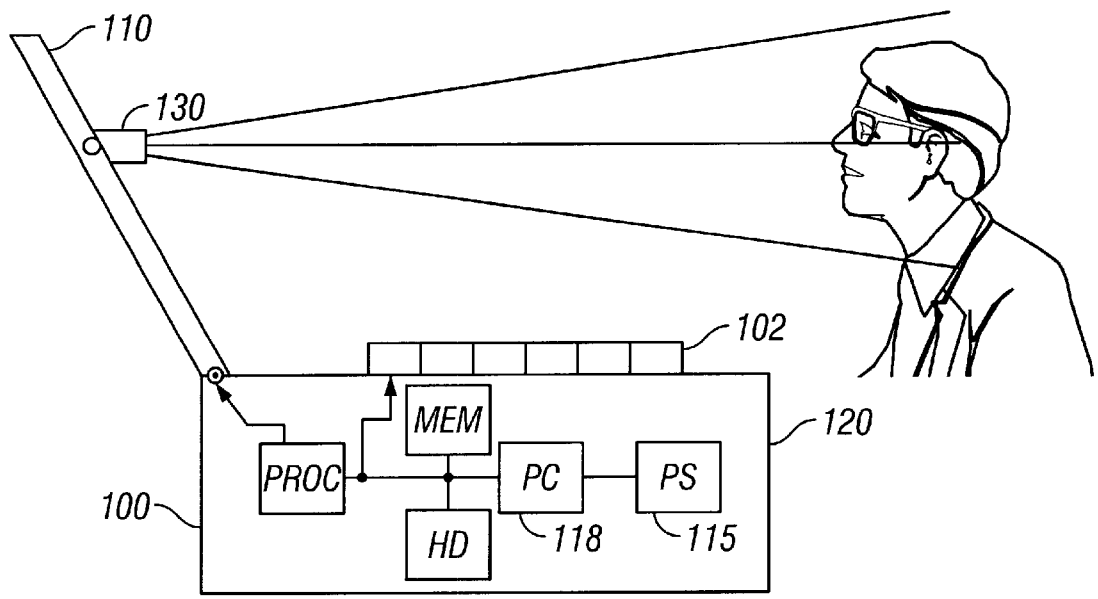
FIG. 1 shows a laptop computer with face tracking software that monitors for the presence of a user's face.

FIG. 1 shows an embodiment of a portable computer 100 using the techniques of the present invention. The portable computer 100 includes a user interface 102 which can include a keyboard and mouse, a processor 104 and memory 106. A display 110 is driven by the processor. The computer also includes a power supply 115 which produces a power output to the various components. At least one of the display 110, the processor 104, and the hard drive 112 is power controlled by a power management module 118, according to results of the system's power control flowchart. The power control can be done according to any well-known technique of power reduction during sleep state. For example, the computer can be power controlled according to the Advanced Configuration and Power Interface ("ACPI") specification, version 1.0, Jan. 6, 1997.

Other electrical functions may be necessary for the computer to operate properly. All of the parts of the computer are integrated into a housing 120.

A camera 130 is either integrated into the housing or attached thereto. The camera 130 can be a small camera, with 640×480 or comparable resolution. The camera acquires an image from the direction where the user is expected, i.e., above the keyboard. The output of the camera is connected to the processor 104, either directly or through an imaging interface chip.

Figure 2:
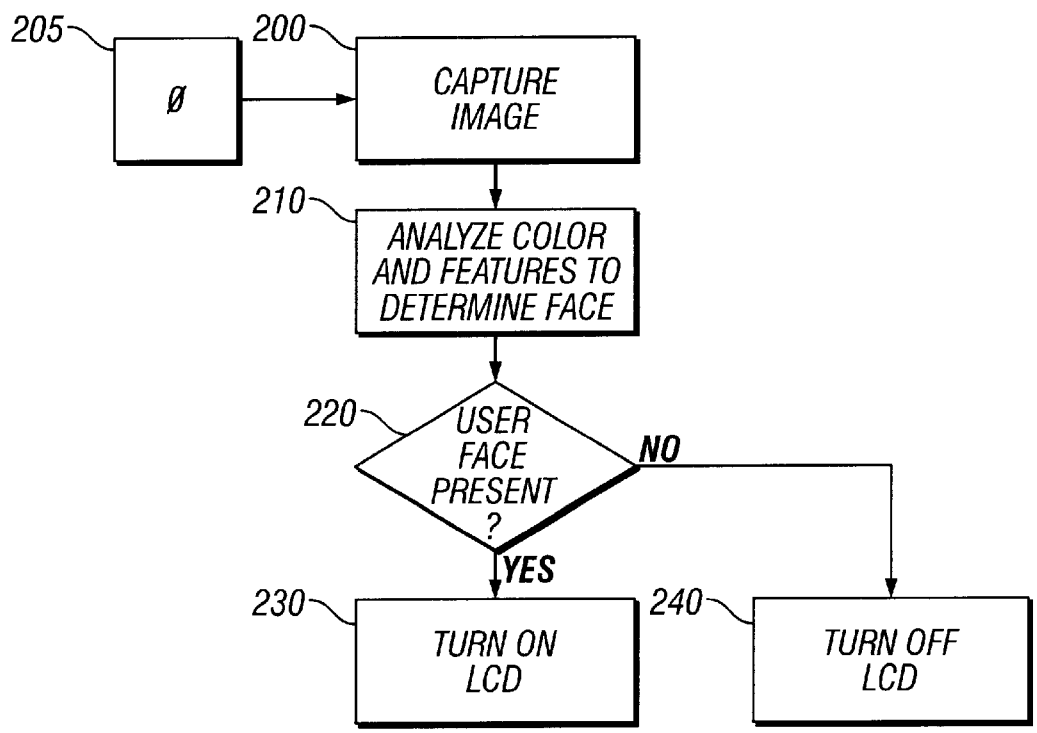
FIG. 2 shows flowchart of operation of a first operation mode.

The operation according to a first mode is shown in the flowchart of FIG. 2.

A step 200, the camera 130 captures an image. This is done periodically under control of the clock 205. For example, the image could be captured every half second.

At step 210, the processor runs a routine based on the image to analyze the contents of the image. The color and features of the image are determined. This can use any available image processing technique to determine the presence of a face. For example, one way of doing, this is by correlating a feature, which is common to a face, across the entire image.

The system can store a number of such features in a memory. This can include a number of different features which represent the shape of common eyes, nose, mouth, ears etc. Each can be correlated across the image to determine if anything that looks like an eye or nose or mouth or ear is within the field of the image.

Another option is to investigate the image, to determine an area of the right color to represent average skin tone of a user.

Step 220 carries out a decision based on whether the user's face is present. If the user's face is present, then the system ends power-reduced mode, and turns on the display at 230. If the user's face is not present, then the system turns off the display at 240.

Since the system operates in real time, the display can be switched off as soon as the user leaves. This can provide significant power saving. Even if the user sits in front the screen reading for ten minutes without checking a key, the screen will never be turned off. This also increases consumer satisfaction, since the screen will not blank while the user is watching it.

The flowchart in FIG. 2 carries out the following pseudocode.

```
WHILE (TRUE)
 {IF (USER IS DETECTED)
    {DISPLAY_STATE = ON}
  ELSE
    {DISPLAY_STATE=OFF}
 }
```

The inventor recognized, however, that monitoring the camera and vision software can itself lead to increased power consumption. A lower power camera, such as one using active pixel sensors, is preferably used to minimize power consumption.

Figure 3:
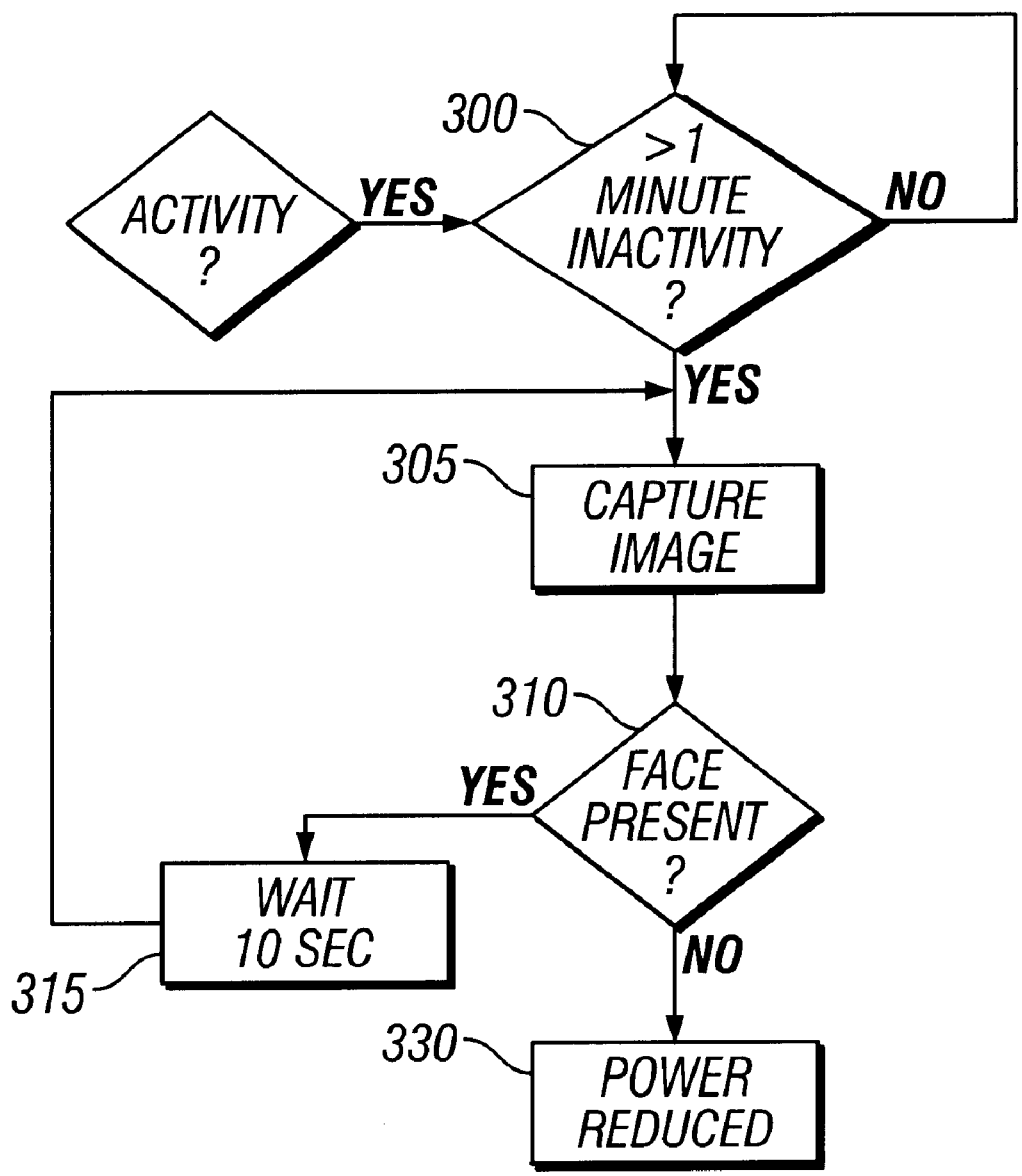
FIG. 3 shows a flowchart of operation of a second operation mode.

The operation of the second embodiment can also reduce the power consumption. Accordingly, a second embodiment is shown in FIG. 3. According to the second embodiment, the camera operation is only carried out after user inactivity for some user selectable time, e.g., one minute. After inactivity for that time, one minute, at step 300, the camera 130 captures an image at step 305. If the face is detected to be present at step 310, then a ten second timer is initiated at step 315, and the image is again captured. At any time during this flowchart, however, any activity causes a return, thus stopping the capture of images until another one minute of inactivity.

If the face is not present at step 310, then the power is reduced at step 330.

After entering the power reduced state, any user activity causes the power reduced mode to end and the user continues his operation.

This is shown in the following psuedocode.

```
WHILE(TRUE)
    WAIT FOR USER INACTIVITY /* IF THE USER IS
    ACTIVE, THEN THE SYSTEM IS IN USE */
    ACTIVATE CAMERA AND VISION SOFTWARE
    START_TIME=CURRENT_TIME( )
    WHILE(CURRENT_TIME( ) - START_TIME < TIMEOUT AND
    USER_INACTIVITY)
        {IF (USER IS DETECTED)
            {DISPLAY_STATE=ON}
        ELSE
            {DISPLAY_STATE=OFF}
        }
    }
    DEACTIVATE CAMERA AND VISION SOFTWARE
    IF(USER_INACTIVITY)
        {DISPLAY_STATE=OFF
        WAIT FOR USE ACTIVITY
        }
    DISPLAY_STATE=ON
```

Other embodiments are contemplated.

What is claimed is:

1. A power control device for a computer, comprising:
   means for determining whether a user is interacting with the computer;
   a user detection system separate from the means for determining whether a user is interacting with the computer, the user detection system configured to determine whether the user is proximate to the computer, wherein the user detection system is inactive when the means for determining whether a user is interacting with the computer determines that the user is interacting with the computer; and
   a power control module configured to reduce power consumption of the computer after the user detection system determines that the user is not proximate to the computer.

2. A device as in claim 1 wherein said power control module reduces power consumption after the user detection system determines that the user is not proximate to the computer for a time equal to a pre-determined absence interval.

3. A device as in claim 1 wherein said user detection system comprises a camera.

4. A device as in claim 1 wherein said power control module reduces power consumption immediately after the user detection system determines that the user is not proximate to the computer.

5. A device as in claim 1 wherein the user detection system is activated after the user has not been interacting with the computer for a pre-determined inactivity interval.

6. A device as in claim 1 wherein when said user detection system is activated, said user detection system periodically determines whether a user is proximate to the computer.

7. A device as in claim 1 wherein said power control module is configured to turn off a display after said user detection system determines that the user is not proximate to the computer.

8. A method of managing power consumption in a computer, comprising:
   monitoring whether a user is interacting with the computer;
   obtaining image data for an area proximate to the computer only after determining that a user is no longer interacting with the computer;
   processing the image data to determine whether a user is proximate to the computer; and
   managing power consumption based on said processing.

9. A method as in claim 8 wherein said managing comprises reducing an amount of power consumption of said computer when said user is not proximate to the computer.

10. A method as in claim 9 further comprising maintaining the power consumption when the user is proximate to the computer.

11. A method as in claim 9 wherein said reducing comprises turning off a display of the computer.

12. A method as in claim 8 wherein said processing comprises comparing the image data to reference data.

13. A method as in claim 12 wherein at least one of said obtaining and said processing is carried out at specified time intervals.

14. A method as in claim 12 wherein at least one of said obtaining and said processing is only carried at specified times.

15. A method as in claim 8, wherein at least one of said obtaining and said processing is only carried out after a specified inactivity interval has passed since the user has interacted with the computer.

16. An apparatus comprising a machine-readable storage medium having executable instructions for reducing power of a communication device, the instructions enabling the machine to:
   monitor whether a user is interacting with a computer;
   obtain image data only after determining that the user is not interacting with the computer;
   process image data to determine whether the user it proximate to said computer; and
   manage power consumption based on said processing.

17. An apparatus as in claim 16, further including a camera for obtaining the image data.

18. An apparatus as in claim 16, wherein the instructions enable the machine to obtain the image data after the user has not been interacting with the computer for a pre-selected inactivity interval.

19. An apparatus as in claim 16, wherein the instructions enable the machine to obtain the image data immediately after the user has not been interacting with the computer for a pre-selected inactivity interval.

* * * * *